UNITED STATES PATENT OFFICE.

JONAS W. AYLSWORTH, OF EAST ORANGE, NEW JERSEY, ASSIGNOR TO CONDENSITE COMPANY OF AMERICA, OF GLEN RIDGE, NEW JERSEY, A CORPORATION OF NEW JERSEY.

CRESOLIC VARNISH COMPOSITION.

1,111,287.     Specification of Letters Patent.     Patented Sept. 22, 1914.

No Drawing.     Application filed June 12, 1912. Serial No. 703,199.

*To all whom it may concern:*

Be it known that I, JONAS W. AYLSWORTH, a citizen of the United States, and a resident of East Orange, in the county of Essex and State of New Jersey, have invented certain new and useful Improvements in Cresolic Varnish Compositions, of which the following is a description.

My invention relates to varnish or enamel compositions which include, in solution, fusible soluble products made from cresol and formaldehyde.

It also relates to a cresol resin which is soluble in various varnish and hydrocarbon oils and solvents, including liquid mono-chloro-naphthalene, and which, dissolved in one of the oils or solvents referred to, constitutes one form of my varnish or enamel composition.

The objects of my invention are to produce improved compositions of this character.

In my application Serial No. 673,362, filed January 25, 1912, I describe and claim a fusible phenol resin, formed by reaction between phenol or cresol and formaldehyde, and processes for forming the same. The present invention, so far as it relates to the cresol resin particularly described, is a specific improvement on that of the application above referred to, in that it causes a reaction between ortho cresol and formaldehyde in specified proportions and in such a manner as to produce a gum or resin which is soluble in various hydro-carbon and varnish oils and molten waxes. Resins made from phenol are not soluble in such oils, and no synthetic resins previously described by other inventors, to my knowledge, have had this property of being so soluble.

My improved composition is useful for mixture with varnish oils and the like, and as an ingredient in compositions in which phenol resin cannot be used because of its insolubility in such oils and substances as those mentioned.

In preparing my improved oil-soluble cresol resin, I preferably proceed as follows. Ortho cresol 30 parts and a 40 per cent. solution of formaldehyde, 14 to 16 parts, together with a small amount of water if desired, from 0 to 8 parts, are heated together in an autoclave to cause the desired reaction which takes place at a temperature of about 270° F. The water, if added, is used to decrease the violence of the reaction. The reaction is controlled by keeping the temperature and pressure in the autoclave down, to prevent a too violent or rapid reaction, so that the reaction may be completed in from three to four hours. Excess cresol and any water formed by the reaction are then removed from the mass preferably by vacuum distillation and the composition is also dehydrated by heating in a vacuum up to approximately a temperature of 350° F.

The resulting gum or resin has a melting point from 140° to 170° F. and contains only a small percentage of free cresol, probably not more than three or four per cent. The resin contains no uncombined formaldehyde and is not hardened into the infusible condensation product or otherwise chemically changed by heating to any temperature less than its decomposition point. This cresol resin is soluble in all proportions in varnish oils and solvents, such as linseed oil, Chinese wood oil, benzol and turpentine oil. It is also soluble in various hot hydrocarbon oils and molten waxes. Where a varnish which does not depend on an added hardening agent is to be used, compositions of the cresol resin described, with one or more of the drying oils, such as linseed oil, and Chinese wood oil, are preferred. The cresol resin described is also soluble in the chloro-derivatives of naphthalene, such as the liquid mono-chloro-naphthalene, and the higher solid chloro-naphthalenes. This is also true of cresol resin made in accordance with my application, Serial No. 673,362, referred to, using cresol instead of phenol in the processes there described. This resin is not, however soluble in the various varnish oils and solvents mentioned above, in which the cresol resin described herein, is soluble. Enamel or lacquer compositions which may be hardened by subsequent heat treatment are preferably made by compounding the cresol resin of either variety and a suitable hardening agent therefor, such as hexa-methylene-tetra-amin, with free cresol and a fluid chloro-naphthalene. The proportions of the latter ingredient may vary in wide limits, for example, from no mono-chloro-naphthalene up to mono-chloro-naphthalene of twice the weight of the cresol resin depending on the desired fluidity and character of the varnish or lacquer desired. The free cresol referred to also may be added in wide limits and if used in large percentages, the methylene-containing hardening agent is proportionally increased.

The free cresol is desirably added, if mono-chloro-naphthalene is the solvent, for the purpose of thinning the composition and also because, if it is used, a better impregnating varnish, for impregnating coils and the like, is made. In such a composition, the hardening agent, hexa-methylene-tetra-amin, or tri-oxy-methlyene or other solid anhydrous polymer of formaldehyde is supplied in the proportion of three or four per cent. of the weight of the cresol resin and an additional amount in the proportion of 20 to 25 per cent. of the weight of the free cresol used. Also, in some cases, solid chloro-naphthalenes or chloro-phenols should be added to the solution since they have the property of reducing the shrinkage of the varnish film during and after hardening, the coefficient of expansion of cresolic compositions being greater than that of those made from phenol. Desirable substances for this purpose are tetra- and hexa-chloro-naphthalenes and tetra-chloro-phenol.

Mono-chloro-naphthalene is especially desirable as a solvent ingredient for compositions which are to be hardened by subsequent heating, because it is liquid at room temperatures, but remains in the hardened composition, apparently in the condition of solid solution as a desirable plasticity ingredient. Cresol resin of both varieties described by me is soluble in mono-chloro-naphthalene in all proportions and mono-chloro-naphthalene is similarly soluble in cresol resin in all proportions by the aid of heat. Phenol resin and mono-chloro-naphthalene, however, are not thus mutually soluble in all proportions. Mono-chloro-naphthalene is soluble in phenol resin when heated therewith in proportions of approximately equal parts, but when larger amounts of mono-chloro-naphthalene are used, they do not remain in solution with the phenol resin. The free cresol referred to is also a desirable solvent element for the varnish composition when provision is made for hardening the same by reaction with an added methylene-containing agent on subsequent heat treatment, the cresol being a liquid, whereas phenol is solid at room temperatures. By the term "cresol" I include mixtures of the three modifications of cresol or mixtures of cresols and phenol which are liquid at room temperatures, the enamel composition which I should prefer to use being one which is fluid at room temperatures.

Having now described my invention what I claim as new and desire to protect by Letters Patent is:—

1. A composition of matter comprising a fusible cresol resin which is soluble in all proportions in linseed oil, benzol, turpentine oil, and other varnish oils and hot hydrocarbon oils, substantially as described.

2. A composition of matter comprising a fusible cresol-formaldehyde condensation product having a melting point of from 140° F. to 170° F. and which is soluble in all proportions in linseed oil and turpentine oil, substantially as described.

3. A composition of matter comprising a fusible cresol resin, which is soluble in all proportions in turpentine, linseed oil, Chinese wood oil, and benzol, and which is unchangeable into an infusible product by heating at any temperature less than that of its decomposition, substantially as described.

4. A composition of matter comprising a fusible anhydrous cresol resin, which is unchangeable into an infusible product by heating at any temperature less than that of its decomposition, and is soluble in all proportions in turpentine oil, benzol, linseed oil, Chinese wood oil, and mono-chloro-naphthalene, substantially as described.

5. A composition of matter comprising a fusible cresol resin, a methylene-containing hardening agent therefor, and a solvent for the said ingredients comprising mono-chloro-naphthalene, substantially as described.

6. A composition of matter comprising a fusible cresol resin, a methylene-containing hardening agent therefor, and a solvent for the said ingredients comprising mono-chloro-naphthalene and free cresol, substantially as described.

7. A composition of matter which is fluid at room temperatures comprising ingredients capable of transformation by heat into a hard infusible cresol-methylene condensation product, and soluble in varnish oils and also in mono-chloro-naphthalene, in all proportions, and a solvent for the said ingredients comprising mono-chloro-naphthalene, substantially as described.

8. A composition of matter comprising a solution of ingredients including a fusible-cresol formaldehyde condensation product and mono-chloro-naphthalene in an amount not greater than one of twice the weight of the said cresol-formaldehyde condensation product, the said product being soluble in mono-chloro-naphthalene in all proportions, and mono-chloro-naphthalene in proportion up to twice the weight of the said product, remaining in solution with the said product at room temperatures, the said composition being capable of transformation by heat into a hard, infusible product, substantially as described.

This specification signed and witnessed this 10th day of June 1912.

JONAS W. AYLSWORTH.

Witnesses:
DYER SMITH,
HENRY SHELDON.